United States Patent

[11] 3,596,441

| [72] | Inventor | Ernest W. Lundahl<br>P.O. Box 2525, Idaho Falls, Idaho 83401 |
|---|---|---|
| [21] | Appl. No. | 795,375 |
| [22] | Filed | Nov. 26, 1968 |
| [45] | Patented | Aug. 3, 1971<br>Continuation-in-part of application Ser. No. 689,616, Dec. 11, 1967, now abandoned. |

[54] FILTERING DEVICE FOR VEHICLE EXHAUST
3 Claims, 5 Drawing Figs.

[52] U.S. Cl. .................................................. 55/376,
 55/380, 55/382, 55/487, 55/527, 60/29
[51] Int. Cl. ........................................................ B01d 46/02
[50] Field of Search ........................................... 55/97, 361,
 366, 371, 378, 376, 379, 380, 381, 382, 385, 387,
 485—487, 527; 60/29; 210/499; 139/383, 387,
 420; 150/1

[56] References Cited
UNITED STATES PATENTS

| 1,294,921 | 2/1919 | Lewis | 285/305 |
| 1,837,317 | 12/1931 | Davidson | 55/381 |
| 1,847,262 | 3/1932 | Reuter | 139/DIG. 1 |
| 1,895,585 | 1/1933 | Riebel, Jr. | 55/371 |
| 2,232,303 | 2/1941 | Bailey | 160/DIG. 12 |
| 2,327,225 | 8/1943 | Taylor | 55/371 |
| 2,555,561 | 6/1951 | Whitehead | 150/1 |
| 2,758,671 | 8/1956 | Silverman et al. | 55/527 |
| 2,964,127 | 12/1960 | Korn | 55/487 |
| 3,100,146 | 8/1963 | Huntington | 55/DIG. 30 |
| 3,365,864 | 1/1968 | Iizima | 55/487 |
| 3,422,602 | 1/1969 | Janson | 55/381 |
| 3,431,581 | 3/1969 | Booth | 15/315 |
| 1,847,352 | 3/1932 | McClatchie | 55/382 |
| 2,888,095 | 5/1959 | Perrini et al. | 55/487 |

FOREIGN PATENTS

| 852,287 | 10/1960 | Great Britain | 15/313 |

Primary Examiner—Frank W. Lutter
Assistant Examiner—Bernard Nozick
Attorney—Luedeka, Fitch, Even & Tabin ABSTRACT: A filtering device is described which attaches temporarily to the exhaust pipe of an internal combustion engine powered automobile. The device includes a multiply bag operating to filter out moisture and solid particles discharged from the exhaust pipe.

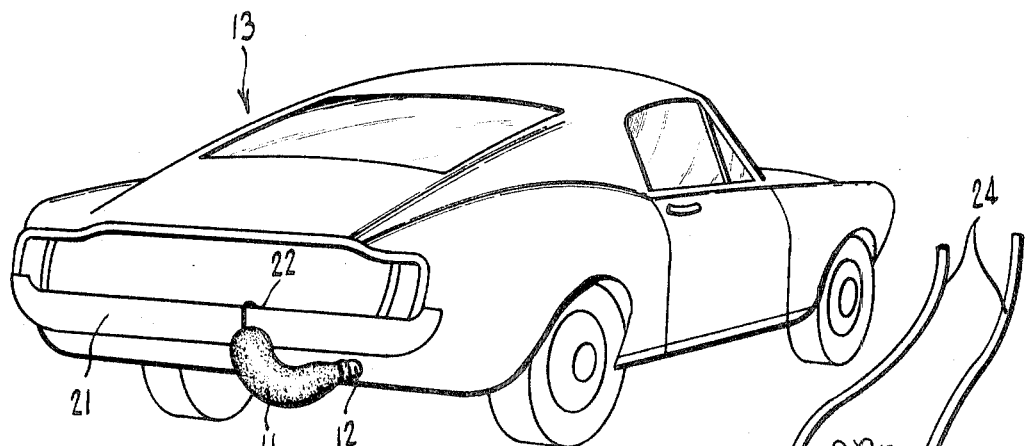
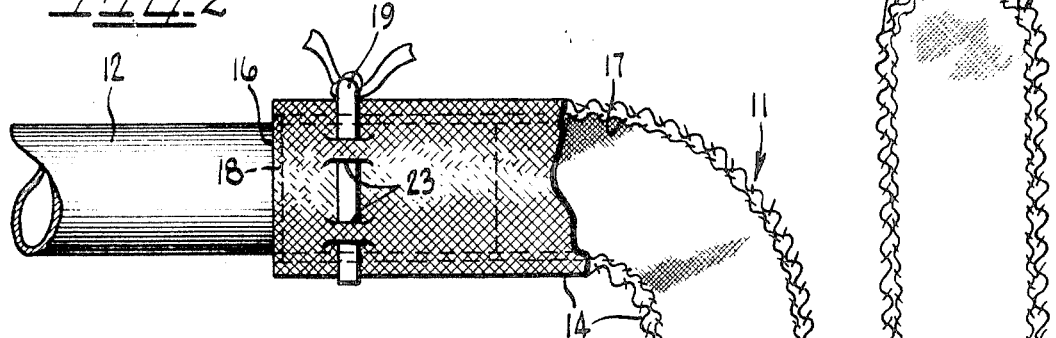
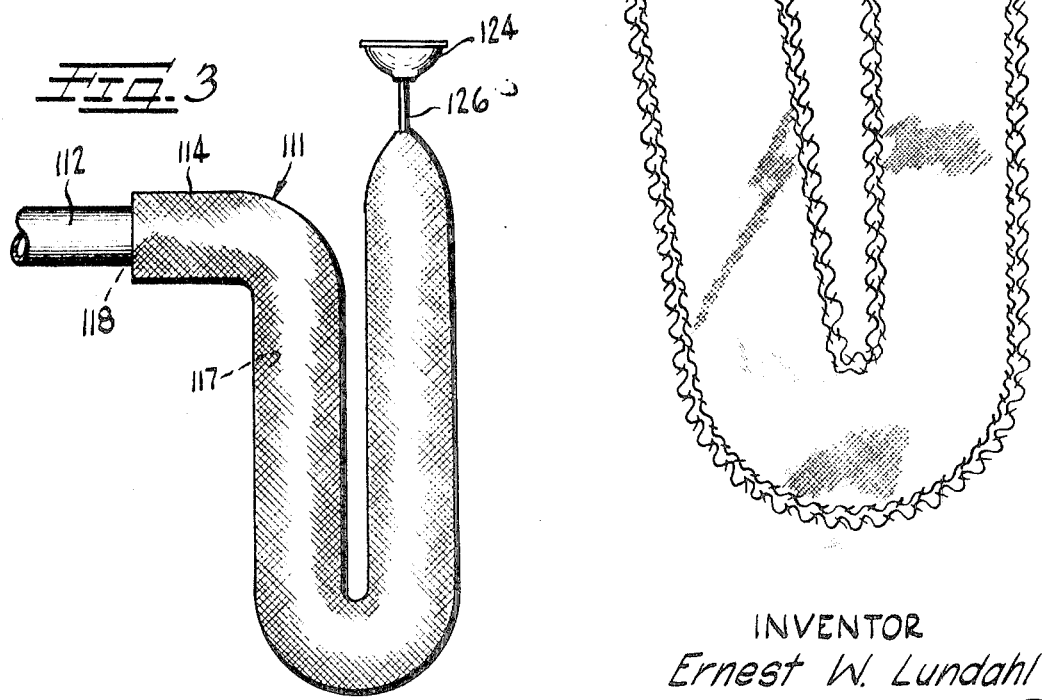
INVENTOR
Ernest W. Lundahl
Anderson, Luedeka, Fitch, Even, & Tabin
ATTORNEYS

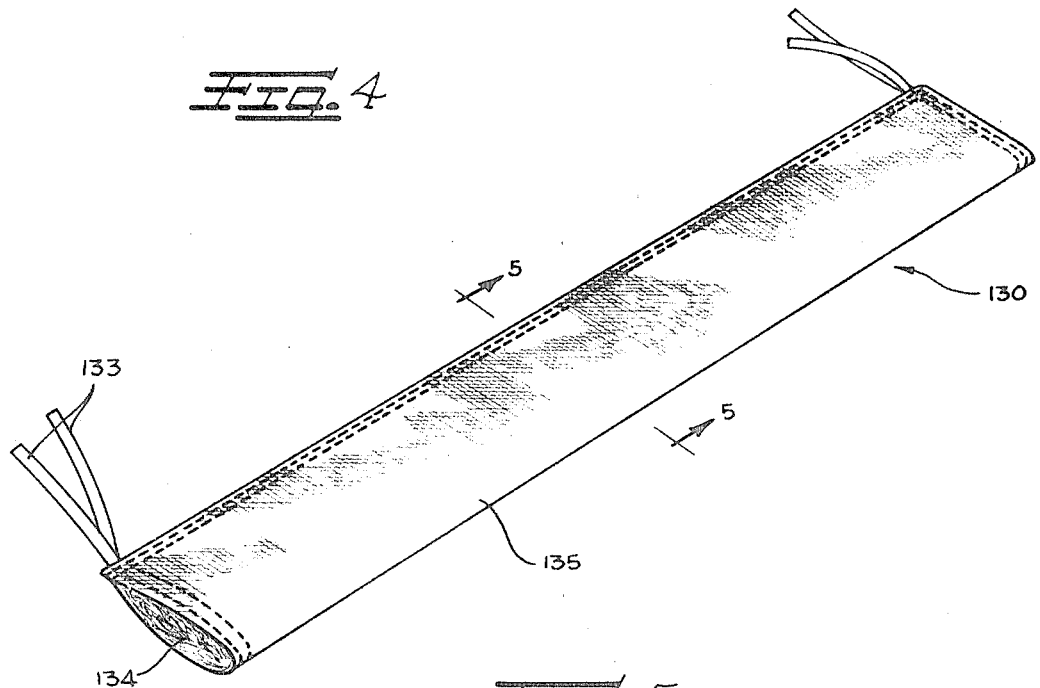
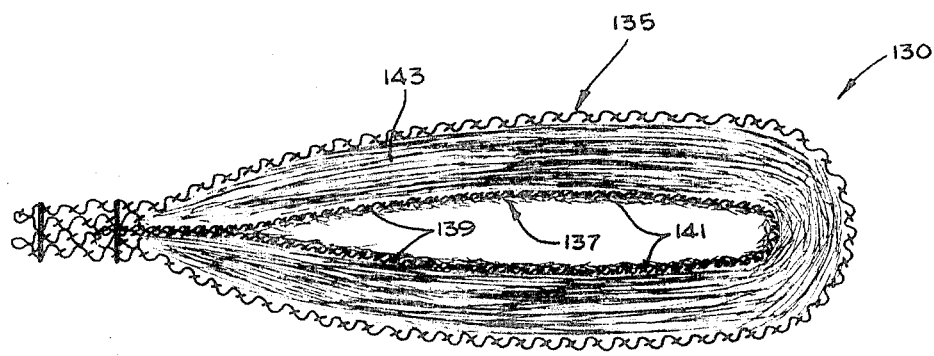

3,596,441

FILTERING DEVICE FOR VEHICLE EXHAUST

This application is a continuation-in-part of copending application, Ser. No. 689,616, filed Dec. 11, 1967 now abandoned and entitled "Filtering Device for Vehicle Exhaust."

This invention relates to filtering devices and, more particularly, to a filtering device which is of a size adapted to temporarily attach to the exhaust pipe of an automobile powered by an internal combustion engine.

Automobile dealers frequently display automobiles for sale to the public in showrooms. Such showrooms are generally attractively designed to provide a pleasant place for potential customers to visit, and to enhance the beauty of the automobiles displayed therein. To this end, many automobile showrooms are provided with decorative wood, tile or carpeted floors.

Automobiles displayed in showrooms may sit for several days or even weeks before being driven from the showroom floor. When such automobiles are powered by internal combustion engines, several days or weeks of nonuse frequently results in condensate, soot and various oxides being ejected through the exhaust pipes of the automobiles when they are started. Such issuing of condensate, soot and various oxides may undesirably discolor the floor of the showroom, diminishing its attractiveness.

Accordingly, it is an object of this invention to prevent condensate, soot and oxides issued from automobile exhausts from discoloring the surrounding area.

Another object of the invention is to provide a simple and inexpensive device which may be utilized to prevent the discoloration of automobile showroom floors when automobiles are driven off the floor.

It is another object of the invention to provide a low cost and attractive exhaust filter for temporarily attaching to the exhaust pipe of an internal combustion engine powered automobile.

Other objects of the invention will become apparent to those skilled in the art from the following description, taken in connection with the accompanying drawings wherein:

FIG. 1 is a perspective view of a portion of an automobile, illustrating the filter device of the invention attached thereto;

FIG. 2 is a side view, partially in section, illustrating one embodiment of the invention;

FIG. 3 is a view similar to FIG. 2 illustrating a further embodiment of the invention;

FIG. 4 is a perspective view of a three-ply bag embodying novel features of the invention; and FIG. 5 is an enlarged, diagrammatic cross-sectional view of the bag of FIG. 4.

Very generally, the filtering device 11 of the invention is of a size adapted to temporarily attach to the exhaust pipe 12 of an internal combustion engine powered automobile 13 to capture moisture and solid particles discharged from the pipe. The filtering device is generally in the shape of an elongated bag of porous, flexible material having an open end 16. An inner ply 17 of hydrophilic fibers and a reduced permeability to air serves to absorb the moisture issuing with the exhaust gas and captures the larger diameter particles of soot and metal oxides being discharged from the exhaust pipe. As will be explained in connection with the preferred embodiment of the invention which is illustrated in FIGS. 4 and 5, a fibrous mat may form the second ply to trap the smaller particles passing through the finer ply 17. Preferably, the second ply is a relatively thick mat or batt having fine tortuous passageways which serve to trap the small particles traveling at a reduced velocity. Means 19 are provided for securing the filter with its open end 16 positioned about the exhaust pipe to permit the exhaust pipe to discharge the gas into the filter.

Referring now particularly to FIG. 1, the automobile 13 is illustrated having an exhaust pipe 12 terminating near the rear bumper 21 of the automobile. The filtering device 11 has one end attached to the exhaust pipe, as will be explained, and preferably has the other end supported by some part of the automobile. In FIG. 1, the device 11 is shown supported at one end by a hook 22 which attaches to the bumper 21 to prevent the filter device from dragging on the floor.

Referring now to FIG. 2, a first embodiment of the invention is illustrated. The device 11 in FIG. 2 comprises outer ply or support bag 14 which is comprised of a porous flexible material. Preferably, the outer bag 14 is comprised of a durable relatively high-strength type of material, such as a heavy cloth, and may be decorative to enhance appearance. The permeability of the material in the outer bag is sufficient to permit exhaust gases to pass therethrough at a greater reduced velocity from that at which the gas leaves the tailpipe. The outer bag 14 is provided with its open end 16 which fits over the end of the exhaust pipe 12 and is fastened thereto by means which will be subsequently described. The outer bag 14 supports the inner ply 17 which in FIG. 2 is in the shape of an elongated bag disposed within the outer bag 14. The inner ply 17 is of generally the same shape as the outer bag 14 and also has an open end 18 which fits over the end of the exhaust pipe 12. The inner ply 17 is preferably formed of an absorbent, hydrophilic filter material, such as porous paper. The filter material of the inner bag has an air permeability which is sufficient to slow down the velocity of the exhaust gas and has a sufficient volume to diffuse the high velocity of the gas entering therein. The void openings in the paper are sufficiently small to capture many of the larger diameter hydrocarbons, metal oxides and droplets of water being discharged from the exhaust pipe. Particularly the inner bag 17 is designed to absorb the sooty water and hold soot and exhaust dusts which may issue from the exhaust pipe when an auto is started which has been standing in one place for several days or weeks. In this manner, materials which can dirty the showroom floor cannot escape from the inner bag in sufficient concentrations or velocities to impinge on the floor covering to discolor a localized area or spot. The inner ply 17 may be removed from the outer bag for replacement.

The open ends 16 and 18 of the inner and outer bags fit over the exhaust pipe and are secured against the exhaust pipe in a manner such that the exhaust pipe discharges into the inner bag 17. The securing means 19 illustrated in FIG. 2 comprises an elongated tie which is threaded through slits 23 in the outer bag and which pulls the outer bag toward the outer surface of the exhaust pipe. With the inner bag 17 positioned between the outer bag and the pipe, the tie may be tightly secured to hold both the inner and outer bags on the pipe.

In order to prevent the filtering device from dragging on the floor, the end thereof opposite the exhaust pipe may be attached to the automobile 13 in some convenient manner. In the device illustrated in FIG. 1, the hook 22 is attached to the end of the outer bag which hook is adapted to engage the bumper 21. In FIG. 2, a pair of elongated tabs 24 are provided on the outer bag adjacent the end of the outer bag opposite the open end 16. These tabs may be tied to the bumper 21 of the automobile or some other convenient appendage on the automobile, such as the license plate holder. As a further alternative, the tabs may be put in the trunk opening and the trunk lid closed to hold the tabs firmly in place.

The device is made sufficiently large for its intended purpose, and is removed when the automobile leaves the showroom. Typically, the outer bag may comprise an assembly about 36 inches in length and 11 inches in circumference. The inner ply 17 may also be a woven fabric formed of textile fibers secured to the outer bag by stitching or tacking so that the liner 17 and the outer bag 14 form a unit. Moreover, in certain applications a chemical filtering material, such as rare earth, may be deposited on the outer bag 14 as a liner.

A further embodiment of the invention is illustrated in FIG. 3. Parts in FIG. 3 having identical function to parts in FIG. 2 have been given the same reference numerals preceded by a 1. In the filter device 111 illustrated in FIG. 3, the outer bag 114 is comprised of a woven cloth which of glass fibers with at least the portion thereof which fits over the exhaust pipe 112 woven on a bias in the manner of the so-called Chinese handcuffs available in many novelty stores. Accordingly, when the outer bag is pulled away from the exhaust, frictional forces exerted on the outer bag by the exhaust pipe tend to oppose such pulling cause a reduction in the circumference of the bag, causing it to grip the exhaust pipe and hold the device from removal. When the automobile engine is started, the greater pressure exerted on the bag from the exhaust issuing from the exhaust pipe 112 results in a tighter gripping of the exhaust pipe 112 by the outer bag.

In the embodiment of FIG. 3, an alternative means are provided for supporting the end of the device opposite the exhaust pipe. Such means comprise a suction cup 124 attached by a suitable cord 126 to the outer bag 114. The suction cup may be fastened to any convenient surface of the automobile, such as the rear bumper or trunk lid, to prevent the filter device from dragging on the floor.

In accordance with a further and preferred embodiment of the invention, there is illustrated in FIG. 4 a filtering device 130 which comprises a multiply filtering bag having an elastic band 133 about an open end 134 thereof for securing the filtering device tightly to the exhaust pipe in the manner hereinbefore described. As with the other embodiments of the invention, the outer ply or bag 135 is preferably formed of a woven fabric of hydrophobic and fire-resistant material, such as fiberglass. The outer covering of fire-resistant fiberglass encloses an inner ply 137 which might catch fire if there was a sudden emission of hot sparks with the exhaust gas. Hydrophobic fibers are preferred to retard migration of moisture to the outer surface of the bag and thereby prevent the migration of sooty water to the outer surface of the bag. Such sooty moisture is best contained in the bag which, after use, is handled by people and which may, in some instances, be allowed to drag across the showroom floor. In use, the outer ply does become discolored indicating that a certain amount of filtering is accomplished by it, although the preferred fabric is quite open so that the gas flows immediately through and from the outer ply to the ambient atmosphere.

An inner ply 137 serves to capture the large sooty particles, diffuse the exhaust gas which is issuing at relatively high velocity and absorb the moisture droplets carried by the exhaust gas. Also, the inner ply 137 serves to remove and trap some of the larger size of metal oxides emitted with the exhaust gas. The preferred inner ply is formed with a woven cloth backing 139 of hydrophilic, absorbent textile fibers, such as cotton, on the inner side of which is a felt or mat 141 of hydrophilic fibers such as cotton. The felted fibers cover many of the pores of the woven cloth backing 139 in the inner ply to prevent the high-velocity gas from carrying large diameter particles at a high velocity through the interstices between the threads comprising the woven backing. The felted fibers also provide a large surface area for absorbing and spreading the moisture droplets from the area at which the exhaust gas is concentrated as the gas issues from the exhaust pipe.

For the purpose of trapping many of the smaller diameter particles of soot and metal oxides, an intermediate ply 143 is disposed between and is generally coextensive with the inner and outer plies 135 and 137. The intermediate ply is preferably a relatively thick batt or mat of nonwoven hydrophobic fibers which provide long and tortuous passageways for the exhaust gas. The preferred bat is a ½ to 1 inch thick batt of small diameter fiberglass fibers which are interwinded and provide traps for capturing the smaller particles which impinge against fibers therein. This thick batt is permeable to the exhaust gas, light in color when new, but quickly becomes stained with trapped, black sooty particles after use indicating the amount of carbon particles trapped therein. The hydrophobic fibers also serve as a moisture barrier to retain the wet and sooty particles in the bag.

Each of the filtering devices illustrated herein is designed to eliminate exhaust "blow bys" in showrooms or places where automobiles may be displayed under conditions where dirty and sooty deposits from the exhaust are undesirable. It will be appreciated that the exhaust from the automobiles is blown with a relatively high velocity and may contain very large amounts of extremely sooty hydrocarbon particles along with moisture droplets which, if impinged upon a small localized area on a floor cover, will stain or discolor the same. Also, such exhaust particles discharged in the air may coat the walls and furniture with greasy and sooty deposits.

The term "auotmobile," as used herein, is intended to refer to any vehicle powered by an internal combustion engine and which may produce undesirable exhaust substances as described.

It may therefore be seen that the invention provides an improved filtering device of a size adapted to temporarily attach to the exhaust pipe of an internal combustion engine powered automobile. The invention also provides such a filtering device in combination with the exhaust pipe of an automobile. Undesirable dirty deposits issued from the exhaust pipe of an automobile after relatively lengthy storage on a showroom floor are collected in the filter device and therefore do not dirty the floor.

Various modifications of the invention in addition to those shown and described herein will become apparent to those skilled in the art from the foregoing description and accompanying drawings. Such modifications are intended to fall within the scope of the appended claims.

I claim:

1. A filtering device for temporary and direct attachment to an external end of an exhaust pipe of an internal combustion engine automobile to capture moisture and solid particles being discharged therefrom comprising a multiply bag having an open end sized to fit on and telescope on the end of the exhaust pipe of an automobile, said bag being elongated with a length at least greater than several times the width thereof, an inner ply woven bag formed of hydrophilic fibers for capturing moisture droplets issuing with said exhaust gas and for capturing large diameter solid particles being discharged from the exhaust pipe, said inner ply bag defining a chamber into which the exhaust gas may diffuse, an outer ply woven bag formed of hydrophobic and fire resistant fibers positioned about said inner ply bag to resist the penetration of the sooty moisture and particles through to the outer surface of the filtering bag, an intermediate ply positioned between said inner ply bag and said outer ply bag, said intermediate ply being a nonwoven fibrous filter batt of fire resistant hydrophobic fibers and providing long tortuous passageways for capturing particles having passed through said inner ply, said intermediate ply being thicker than said inner and outer plies, means securing said bag plies together to define a unitary bag, and means collapsing said open end about and to said open end exhaust pipe for directly securing said filter bag about the exhaust pipe to permit the exhaust pipe to discharge therein.

2. The filtering device in accordance with claim 1 in which said intermediate ply is a nonwoven batt or fibrous material having a thickness in the range of ¼ to 1 inch.

3. A device according to claim 1 including attaching means secured to said bag near the end thereof opposite said open end, said attaching means being adapted for attachment to an external portion of the auto for supporting said filtering device.